Figure 1:
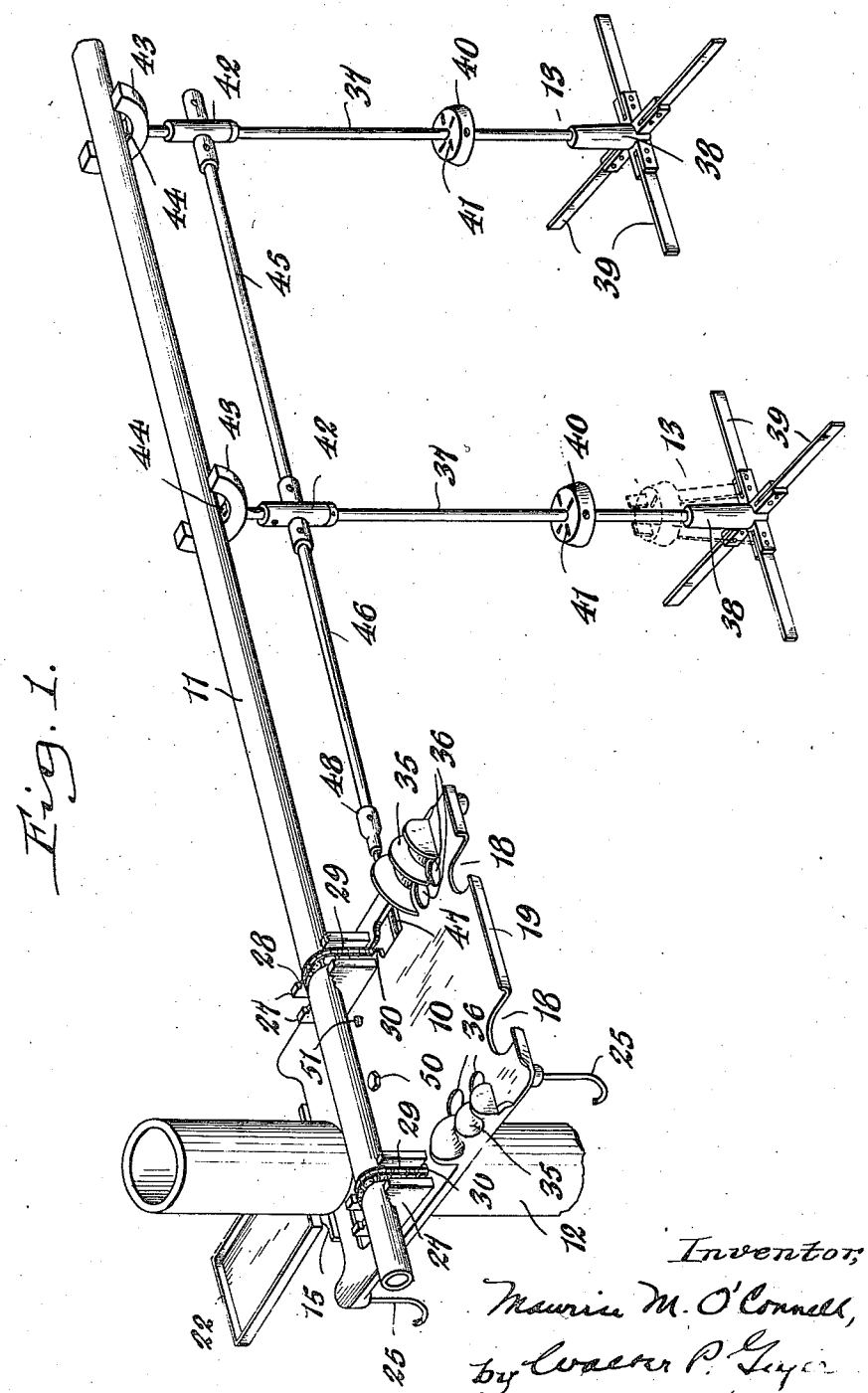

Feb. 9, 1943.　　　M. M. O'CONNELL　　　2,310,255
PIPE HANDLING EQUIPMENT
Filed April 7, 1941　　　3 Sheets-Sheet 1

Inventor,
Maurice M. O'Connell,
by Walter P. Guye
Attorney.

Feb. 9, 1943.  M. M. O'CONNELL  2,310,255
PIPE HANDLING EQUIPMENT
Filed April 7, 1941  3 Sheets-Sheet 2
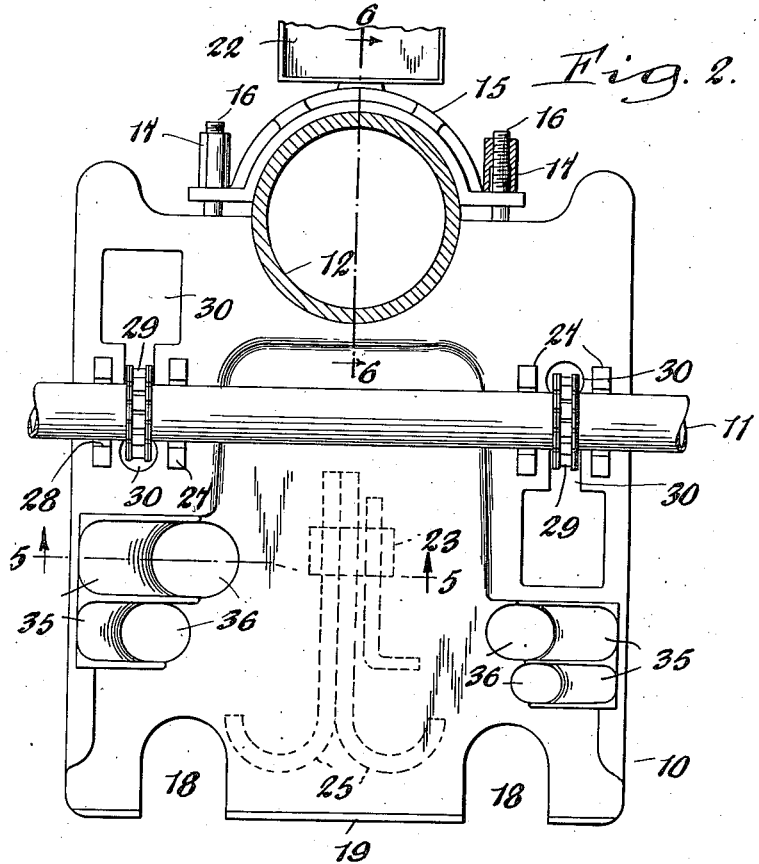
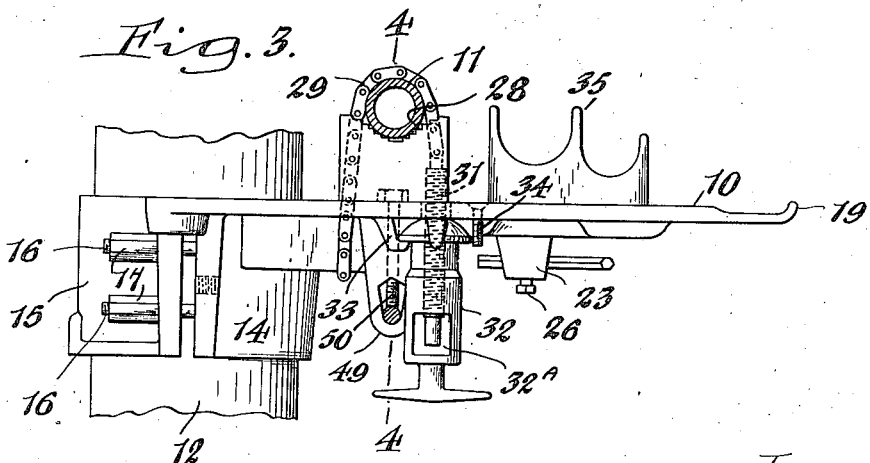

Feb. 9, 1943. M. M. O'CONNELL 2,310,255
PIPE HANDLING EQUIPMENT
Filed April 7, 1941 3 Sheets-Sheet 3
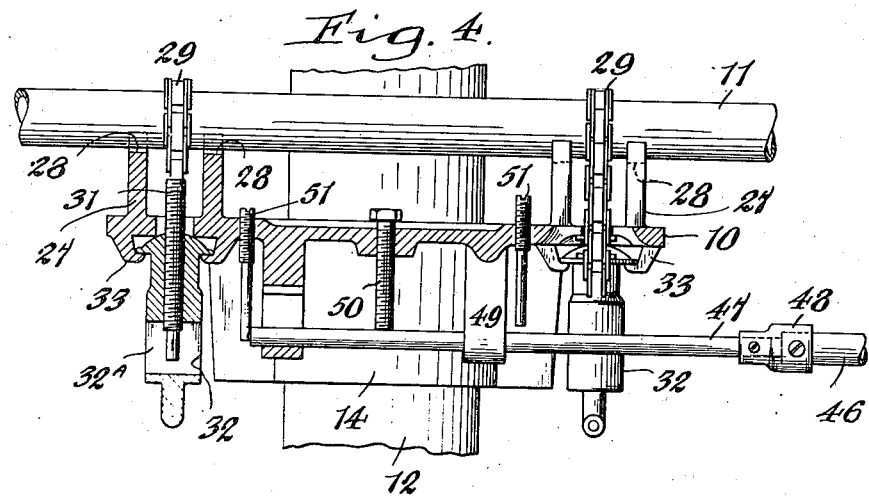
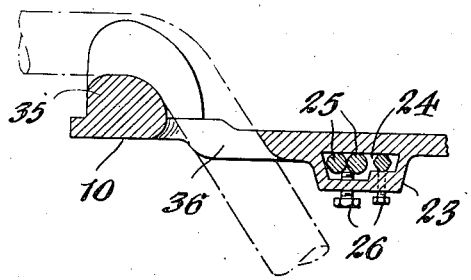
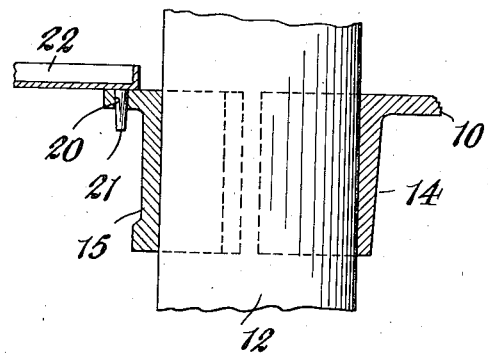
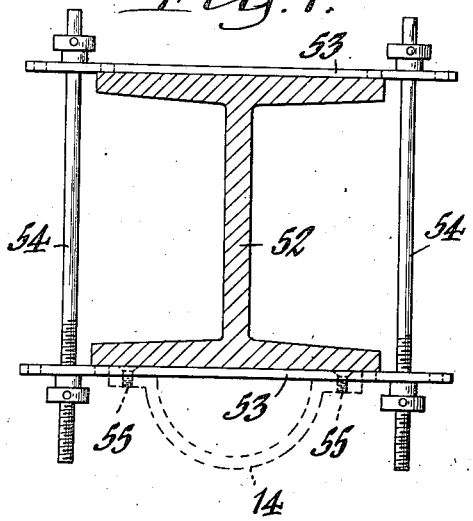
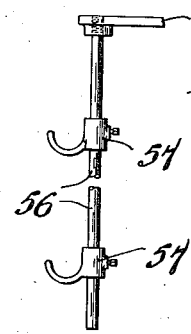

UNITED STATES PATENT OFFICE 2,310,255

PIPE HANDLING EQUIPMENT

Maurice M. O'Connell, Buffalo, N. Y.

Application April 7, 1941, Serial No. 387,175

2 Claims. (Cl. 81—41)

This invention relates generally to pipe handling equipment but more particularly to equipment designed for the handling of pipe as used by plumbers, fitters, etc.

It has for one of its objects to provide equipment of this character which is designed to meet modern building requirements and conveniences, which is simple, compact and rugged in construction, and which affords a material saving of time and energy in the handling of pipe for cutting, threading and other pipe-fitting operations.

Another object of the invention is to provide an efficient pipe-handling apparatus which is so designed that it affords maximum safety in use and minimizes accidents, and may be readily assembled on the job for use and as readily knocked down and transported elsewhere for use.

A still further object is the provision of an inexpensive pipe handling equipment whose parts are readily adjustable to meet the various working conditions encountered on a given job.

Other features of the invention reside in the construction and arrangement of parts hereinafter described and particularly pointed out in the appended claims.

In the accompanying drawings:

Figure 1 is a perspective view of the pipe handling equipment embodying my invention. Figure 2 is a top plan view of the pipe vise platform and its associated parts. Figure 3 is a side view thereof, showing a section of pipe in the pipe-vise. Figure 4 is a cross section taken in the plane of line 4—4, Figure 3. Figure 5 is a fragmentary cross section taken on line 5—5, Figure 2. Figure 6 is a fragmentary section taken in the plane of line 6—6, Figure 2. Figure 7 is a cross section showing a modified form of adaptor for attaching the pipe vise platform to a channel post or support. Figure 8 is a side view of a modified form of a platform-suspended support for pipe fitting tools and the like.

Similar characters of reference indicate corresponding parts throughout the several views.

In the preferred embodiment of the invention shown in the drawings, and which is designed to be set up for use on the piping job to be installed, the same consists of a table or platform 10 adapted to support and clamp the pipe 11 to be cut, threaded or otherwise operated upon and itself supported upon an upright post 12 which may constitute one of the uprights on a building where the piping is being installed. Supported on the floor of the building and suitably spaced from the platform 10 are one or more cooperating pipe-supporting devices indicated generally by the numeral 13.

The table or platform 10 is provided at its rear end with a semi-circular collar 14 which is adapted to embrace one side of the post 12 and to be securely fastened thereto by a mating, semi-circular collar 15 through the medium of clamping bolts 16 and companion sleeve-like nuts 17. By this construction the platform may be readily adjusted at any desired elevation on the post 12 to suit the convenience of the pipe-fitter. At its front end, the platform is provided with one or more recesses 18 for temporarily supporting any tools thereon used during pipe-fitting operations, and a flange 19 rising from the front ends of this platform acts as a retainer for preventing the tools from accidentally slipping out of their recesses. The platform-clamping collar 15 is provided at its upper end with an opening 20 to receive a depending pin 21 on a tray 22 which is adapted to be removably supported upon such collar and serves as a support for such accessories as an oil can or the like used by the pipe-fitter during pipe-handling operations. In its bottom face, as shown in Figure 5, the platform is provided substantially centrally thereof with a depending lug 23 having an opening 24 therein to removably support, when not in use, hooks 25 or like elements, such hooks being threaded at one end and shown in use in Figure 1 as supported from the corners of the platform and depending therefrom to temporarily support pipe fitting tools. Suitable bolts 26 serve to clamp the elements 24 and 25 in the platform-lug 23 when not in use. These features which are built into and constitute a part of the platform add to the convenience of the plumber or pipe fitter while working on a given job.

Rising from the platform at its opposite sides and adjacent the rear end thereof, are duplex pipe vise units each consisting of spaced pipe-receiving blocks 27 suitably secured to the platform and having substantially V-shaped pipe-receiving recesses 28 therein. Disposed between these blocks and extending over the pipe 11 for securely retaining the latter in the block-recesses is a chain tong 29 which passes at its free ends through suitable openings 30 in the platform, one end of the chain tong being suitably held against upward displacement relative to the platform while the other end thereof is connected to an adjusting screw 31 extending through the companion platform-opening 30 and having an adjusting nut-like member 32 threaded thereon so that upon turning the latter in one direction or the other the chain tong is accordingly tightened or loosened. An opening in this member serves as a window whereby the fitter may observe the position of the adjusting screw relative thereto. As shown in Figure 3, this nut-like member is supported against endwise movement in shouldered lugs 33 applied in an annular fashion to the platform and is free to turn relative to such lugs. Three of such lugs are employed while a screw 34 serves to detachably retain the nut-like member in its operative position between the lugs. Upon removing the screw 34 from contacting engagement with such member, it may be detached from the platform. The vises 27 support the pipe at spaced points and thereby anchor it firmly in position, preventing any slippage or lateral displacement and reduce fatigue of the worker and accidents to a minimum.

Applied to opposite sides of the platform forwardly of the pipe vise units, are pipe bending dies 35 which are of different sizes to accommodate different sized pipes. Inwardly of each die the platform has a pipe-receiving opening 36 and in bending a piece of pipe the same is inserted into this opening in the manner shown in Figure 5 and then bent around the companion bending die. The bending dies are deeply recessed to effectually hold the pipe and the underside of the platform about the opening 36 is curved so as to firmly support and prevent damaging the pipe during bending.

Each of the floor-engaging pipe supporting devices 13 consists of an upright post 37 provided at its lower end with a collar 38 having foldable bracing arms 39 pivoted thereon for reliably sustaining the post against tipping over. These braces 39 are of different lengths to enter slots 41 readily. A keeper 40 slidingly mounted on the post having slots 41 therein is adapted to engage the arms 39 when folded against the post and retain them in such folded position. To facilitate the entry of these arms, when folded, into the keeper, they are preferably of different lengths so that they may be inserted one at a time into the keeper-slots. At its upper end the post is provided with a vertically-adjustable head or fitting 42 in which is removably seated a pipe-supporting yoke 43 of substantially U-shape and equipped with anti-friction balls or rollers 44 on which the pipe 11 being worked upon is adapted to rest. The adjoining floor-engaging devices 13 are coupled to one another at their upper ends to maintain their pipe-engaging yokes in proper alinement through the medium of a tie rod 45 connected at its ends to the companion fittings 42. By this construction the piping is effectually supported and it can be readily shifted axially, when desired, easily and with a minimum of friction.

Means are provided for connecting the pipe-supporting device 13 nearest the platform 10 with the latter to thereby maintain these parts firmly in alining relation. To this end, a sectional tie rod 46, 47 is provided whose section 46 is connected at one end to the fitting 42 of the adjoining device 13, while its other end is coupled by a slip fitting 48 with the companion, platform-supported rod-section 47. The other end of the latter is supported in a pair of slotted lugs 49, of wedge shape to assure perfect alinement, depending from the platform 10 and held against movement therein by a clamping screw 50, while a second screw 51 located adjacent each lug is provided for limiting endwise movement of the rod section 47 in one direction. The tie-rod section 47 borne by the platform is adapted to project from either side thereof, depending upon the location of the floor-engaging supporting devices 13 or obstructions of the building which might interfere with the operations. Should these floor-engaging devices be disposed at the opposite side of the platform from that viewed in Figure 1, then the rod 47 is mounted in reverse position with its coupling fitting 48 disposed at the left of the platform, the companion screw 51 limiting endwise movement of the rod in a direction to uncouple the fitting 48. In either installation the free end of the platform-supported, rod-section 47 is within the dimensional area of the platform and either screw 51 prevents its displacement from such position.

In Figure 7 I have shown an adapter fitting for attaching the platform 10 to a channel beam 52 or like rectangular building support. This fitting includes bars 53 applied to the opposite faces of the beam and secured thereto by tie bolts 54. To one of these bars the platform-collar 14 is suitably fastened, as by screws 55.

If desired, the platform-suspended elements 25 may consist of posts 56, shown in Figure 8, having adjustable hook-shaped fittings 57 thereon which may be of different sizes to support the pipe-fitting tools being used on the job.

I claim as my invention:

1. Pipe handling equipment of the character described, comprising a platform adapted to be attached to a supporting post of a building and having vises thereon for receiving and clamping a section of pipe to be operated upon, a coupling member adjustably mounted on said platform to assume an operative position at one side or the other thereof, a floor-engaging device spaced from the platform and provided at its upper end with a member for receiving the extended end of such pipe-section, and means applied to said device for detachably connecting it to said platform coupling member to maintain the former in fixed relation to the latter.

2. Pipe handling equipment of the character described, comprising a platform adapted to be attached to a supporting post of a building and having vises thereon for receiving and clamping a section of pipe to be operated upon, a coupling member adjustably mounted on said platform to assume a position projecting from one side or the other thereof, a floor-engaging device adapted to be disposed in spaced relation at one side of said platform and provided at its upper end with a member for receiving the extended end of said pipe-section, means projecting from the lower end of said device for sustaining it in an upright position, and means projecting from said device intermediate its upper and lower ends and adapted for detachable connection to said platform coupling member to maintain said device in pipe-alined relation with the platform.

MAURICE M. O'CONNELL.